United States Patent
Doughty et al.

(10) Patent No.: US 10,829,225 B2
(45) Date of Patent: Nov. 10, 2020

(54) TRACK FITTING WITH QUICK RELEASE LOCK FOR AIRCRAFT SEATING

(71) Applicant: AMI Industries, Inc., Colorado Springs, CO (US)

(72) Inventors: Kyle D. Doughty, Colorado Springs, CO (US); Keith M. Ferguson, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 0 days.

(21) Appl. No.: 16/216,555

(22) Filed: Dec. 11, 2018

(65) Prior Publication Data
US 2020/0180769 A1 Jun. 11, 2020

(51) Int. Cl.
*B64D 11/06* (2006.01)
*B60N 2/90* (2018.01)
*B60N 2/07* (2006.01)

(52) U.S. Cl.
CPC ........ *B64D 11/0696* (2013.01); *B60N 2/0715* (2013.01); *B60N 2/929* (2018.02)

(58) Field of Classification Search
CPC ...... B60N 2/0155; B60N 2/07; B60N 2/0702; B64D 11/0696; B64D 11/064
USPC ................ 248/424, 646, 647, 649, 676, 677
See application file for complete search history.

(56) References Cited

U.S. PATENT DOCUMENTS

| | | | | |
|---|---|---|---|---|
| 4,796,837 A | * | 1/1989 | Dowd ................ | B64D 11/0696 244/122 R |
| 4,911,381 A | * | 3/1990 | Cannon .............. | B64D 11/0696 244/122 R |
| 5,236,153 A | | 8/1993 | LaConte | |
| 5,762,296 A | | 6/1998 | Gilbert | |
| 5,871,318 A | * | 2/1999 | Dixon ................ | B60N 2/01558 244/118.1 |
| 6,260,813 B1 | * | 7/2001 | Whitcomb ......... | B64D 11/0696 244/118.6 |
| 6,659,402 B1 | | 12/2003 | Prochaska | |
| 7,021,596 B2 | | 4/2006 | Lory | |
| 7,029,215 B2 | | 4/2006 | Dowty | |
| 7,232,096 B1 | * | 6/2007 | Ahad ................. | B64D 11/0696 244/118.6 |
| 7,448,822 B2 | | 11/2008 | Nebeker et al. | |

(Continued)

FOREIGN PATENT DOCUMENTS

DE 202005013714 12/2005
EP 3543127 9/2019

(Continued)

OTHER PUBLICATIONS

European Patent Office, European Search Report dated May 4, 2020 in Application No. 19215110.8.

*Primary Examiner* — Terrell L McKinnon
*Assistant Examiner* — Michael McDuffie
(74) *Attorney, Agent, or Firm* — Snell & Wilmer L.L.P.

(57) ABSTRACT

A track fitting for securing a seat pedestal of an aircraft seat to a floor of an aircraft may comprise a strut and a lock assembly. The strut may include an aft section configured to attach to an aft foot of the seat pedestal, a forward section configured to attach to a forward foot of the seat pedestal, and a central section extending between the aft section and the forward section. The lock assembly may be located proximate the aft section of the strut.

16 Claims, 8 Drawing Sheets

(56) References Cited

U.S. PATENT DOCUMENTS

| | | | | |
|---|---|---|---|---|
| 8,292,224 B1* | 10/2012 | Ahad | | B61D 33/0057 |
| | | | | 244/118.6 |
| 8,602,702 B2 | 12/2013 | Roy et al. | | |
| 8,979,450 B2 | 3/2015 | Huber et al. | | |
| 9,663,232 B1* | 5/2017 | Porter | | B60N 2/01516 |
| 9,669,934 B2 | 6/2017 | Mejuhas | | |
| 9,878,639 B2 | 1/2018 | Sawdy | | |
| 2005/0180836 A1* | 8/2005 | Dowty | | B64D 11/0696 |
| | | | | 410/105 |
| 2007/0138821 A1* | 6/2007 | Mejuhas | | B64D 11/0696 |
| | | | | 296/65.01 |
| 2007/0228249 A1* | 10/2007 | Ponzo De Siqueira | | B64C 1/20 |
| | | | | 248/503 |
| 2007/0232101 A1* | 10/2007 | Hudson | | B64D 11/0696 |
| | | | | 439/157 |
| 2008/0231092 A1 | 9/2008 | Silva | | |
| 2009/0302665 A1* | 12/2009 | Dowty | | B61D 33/0057 |
| | | | | 297/463.1 |
| 2010/0116933 A1* | 5/2010 | Erickson | | B64C 1/20 |
| | | | | 244/118.5 |
| 2011/0073742 A1* | 3/2011 | Marechal | | B64D 11/0696 |
| | | | | 248/503.1 |
| 2011/0121155 A1* | 5/2011 | Salani | | B64D 11/0696 |
| | | | | 248/429 |
| 2012/0217368 A1* | 8/2012 | Zunino | | B60N 2/01575 |
| | | | | 248/429 |
| 2015/0192162 A1* | 7/2015 | Jones | | B64D 11/0696 |
| | | | | 403/27 |
| 2016/0016668 A1* | 1/2016 | Danet | | B64D 11/0696 |
| | | | | 248/188.9 |
| 2017/0341756 A1* | 11/2017 | Fuerstenberg | | B64D 11/0639 |
| 2018/0134182 A1* | 5/2018 | Hoshide | | B60N 2/0727 |
| 2018/0194476 A1* | 7/2018 | Gross | | B60N 2/01516 |
| 2019/0092476 A1* | 3/2019 | Gross | | B60N 2/10 |
| 2019/0092478 A1* | 3/2019 | Gilbert | | B64C 1/20 |
| 2019/0144119 A1* | 5/2019 | Danet | | F16B 2/02 |
| 2019/0144120 A1* | 5/2019 | Danet | | B64D 11/0696 |
| | | | | 297/463.1 |
| 2019/0217938 A1* | 7/2019 | Cysewski | | B64D 11/0696 |
| 2019/0291871 A1* | 9/2019 | Jacobson | | B60N 2/01575 |
| 2019/0315472 A1* | 10/2019 | Wolgast | | B64D 11/0648 |
| 2019/0315473 A1* | 10/2019 | Mochizuki | | B64D 11/0696 |

FOREIGN PATENT DOCUMENTS

| | | |
|---|---|---|
| GB | 2275296 | 8/1994 |
| GB | 2406877 | 4/2005 |
| GB | 2426549 | 11/2006 |
| GB | 2477100 | 7/2011 |
| GB | 2532561 | 5/2016 |
| WO | 2012100152 | 7/2012 |

* cited by examiner

TRACK FITTING WITH QUICK RELEASE LOCK FOR AIRCRAFT SEATING

FIELD

The present disclosure relates aircraft seats, and, more specifically, to track fitting assemblies for aircraft seats.

BACKGROUND

Aircraft seats generally include a track fitting attached to each of the seat's four feet. The track fittings are configured to engage a longitudinal track along the aircraft floor and lock the aircraft seat to inhibit fore and aft motion of the seat. The track fittings are discrete from one another, such that manipulation of one track fitting does not affect the other track fittings. Aligning four discrete track fittings can increase installation time and difficulty, as positioning each of the four track fittings within the longitudinal track can be problematic. Additionally, each of the track fittings may include its own locking mechanism, such that installing and/or removing the seat involves engaging or disengaging four separate locks.

SUMMARY

A track fitting for securing a seat pedestal of an aircraft seat to a floor of an aircraft is disclosed herein. In accordance with various embodiments, the track fitting may comprise a strut and a lock assembly. The strut may include an aft section configured to attach to an aft foot of the seat pedestal, a forward section configured to attach to a forward foot of the seat pedestal, and a central section extending between the aft section and the forward section. The lock assembly may be located proximate the aft section of the strut.

In various embodiments, the aft section of the strut may comprise a plurality of aft protrusions extending horizontally from the strut, and the forward section of the strut may comprise a plurality of forward protrusions extending horizontally from the strut. In various embodiments, the aft section of the strut may further comprise a plurality of aft flanges extending vertically from the strut, and the forward section of the strut may further comprise a plurality forward flanges extending vertically from the strut.

In various embodiments, the lock assembly may comprise a plunger and a spring configured to apply a biasing force to the plunger. A portion of the plunger may comprise a channel defined by a first lug arm and a second lug arm of the plunger.

In various embodiments, the plunger may be configured to rotate between an unlocked position and a locked position. In the unlocked position, the first lug arm and the second lug arm of the plunger may be located on a top surface of the strut. In the locked position, the strut may be located between the first lug arm and the second lug arm of the plunger.

In various embodiments, the aft section of the strut may comprise a first aft protrusion extending from a first sidewall surface of the strut, and a second aft protrusion extending from a second sidewall surface of the strut opposite the first sidewall surface of the strut. A width of the plunger, as measured between an external surface of the first lug arm and the second lug arm, may be equal to a width of the strut as measured between the first aft protrusion and the second aft protrusion.

In various embodiments, a sidewall surface of the central section of the strut may define a groove.

A seat pedestal is also disclosed herein. In accordance with various embodiments, the seat pedestal may comprise a forward foot, an aft foot located aft of the forward foot, and a track fitting coupled to the forward foot and the aft foot. The track fitting may comprise a strut and a lock assembly. The strut may include an aft section coupled to the aft foot, a forward section coupled to the forward foot, and a central section extending between the aft section and the forward section. The lock assembly may be located proximate the aft section of the strut.

In various embodiments, the lock assembly may comprise a plunger and a spring configured to apply a biasing force to the plunger. A portion of the plunger may comprise a channel defined by a first lug arm and a second lug arm of the plunger. In various embodiments, the plunger may be configured to rotate between an unlocked position and a locked position. In the unlocked position, the first lug arm and the second lug arm of the plunger may be located on a top surface of the strut. In the locked position, the strut may be located between the first lug arm and the second lug arm of the plunger.

In various embodiments, the aft section of the strut may comprise a first aft protrusion extending from a first sidewall surface of the strut, and a second aft protrusion extending from a second sidewall surface of the strut opposite the first sidewall surface of the strut. A width of the plunger, as measured at an external surface of the first lug arm and the second lug arm, may be equal to a width of the strut as measured between the first aft protrusion and the second aft protrusion.

In various embodiments, a sidewall surface of the central section of the strut may define a groove.

In various embodiments, the aft section of the strut may comprise a first aft protrusion extending horizontally from a first sidewall surface of the strut, a second aft protrusion extending horizontally from a second sidewall surface of the strut opposite the first sidewall surface of the strut, and a shelf located proximate a top surface of the strut. A first width of the strut, as measured at the shelf, may be less than a second width of the strut, as measured between the first aft protrusion and the second aft protrusion.

In various embodiments, the first width of the strut, as measured at the shelf, may be greater than a third width of the strut, as measured between the first sidewall surface and the second sidewall surface.

An aircraft seat assembly is also disclosed herein. In accordance with various embodiments, the aircraft seat assembly may comprise a seat pedestal and a track fitting. The seat pedestal may include a forward foot, an aft foot, and a track fitting coupled to the forward foot and the aft foot. The track fitting may comprise a lock assembly located proximate the aft foot. The seat track may be configured to receive the track fitting.

In various embodiments, the track fitting may comprise a strut. The strut may include an aft section coupled to the aft foot, a forward section coupled to the forward foot, and a central section extending between the aft section and the forward section. The aft section of the strut may comprise a plurality of aft protrusions extending horizontally from the strut, and the forward section of the strut may comprise a plurality of forward protrusions extending horizontally from the strut.

In various embodiments, the lock assembly may comprise a plunger. A portion of the plunger may comprise a channel defined by a first lug arm and a second lug arm of the plunger. In various embodiments, the plunger may be configured to rotate between an unlocked position and a locked position. In the unlocked position, the first lug arm and the second lug arm of the plunger may be located on a top surface of the strut. In the locked position, the strut may be located between the first lug arm and the second lug arm of the plunger.

In various embodiments, the track fitting may be configured to translate between an unlocked state and a locked state. In the unlocked state, the plunger may be in the unlocked position and the plurality of aft protrusions may be vertically aligned with a plurality of arcuate access openings defined by the seat track. In the locked state, the plunger may be in the locked position and the plurality of aft protrusions may be vertically aligned with a plurality of neck sections of the seat track.

In various embodiments, in the locked state, the plunger may be located in a first arcuate access opening of the plurality of arcuate access openings, and at least one of the first lug arm or the second lug arm may contact a first neck section of the plurality of neck sections.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following figures, wherein like reference numbers denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, coupled, or the like may include permanent, removable, temporary, partial, full and/or any other possible attachment option. Additionally, any reference to without contact (or similar phrases) may also include reduced contact or minimal contact.

Surface shading lines and/or cross-hatching may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity. An X-Y-Z axis has been provided in various figures for ease of illustration. In the provided X-Y-Z axis, the Z-axis is oriented in a forward to aft direction, the Y axis is oriented in a vertical direction, perpendicular to the Z-axis and to the floor of an aircraft, and the X-axis is oriented in a horizontal direction, perpendicular to the Z-axis and parallel the floor of an aircraft.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

Aircraft seats of the present disclosure may include track fittings extending between aft and forward feet of the aircraft seat. The track fittings are configured to provide an interface between the seat structure and tracks extending longitudinally (i.e., fore to aft) along a floor of the aircraft. In various embodiments, each track fitting may include a quick-release lock located proximate an aft section of the track fitting.

Locating the quick-release lock in the aft section of the track fitting may allow a weight of the track fitting to be reduced, as the force applied to the track fitting during a braking and/or a high impact event (e.g., a rejected take-off or a crash) places the portions of the track fitting forward of the quick-release lock in tension, rather than compression. In this regard, a reduced amount of material and/or a lighter weight material may be employed for the track fitting because the track fitting is unlikely to experience compression forces associated with bending or "buckling" of the track fitting.

Figure 1A:
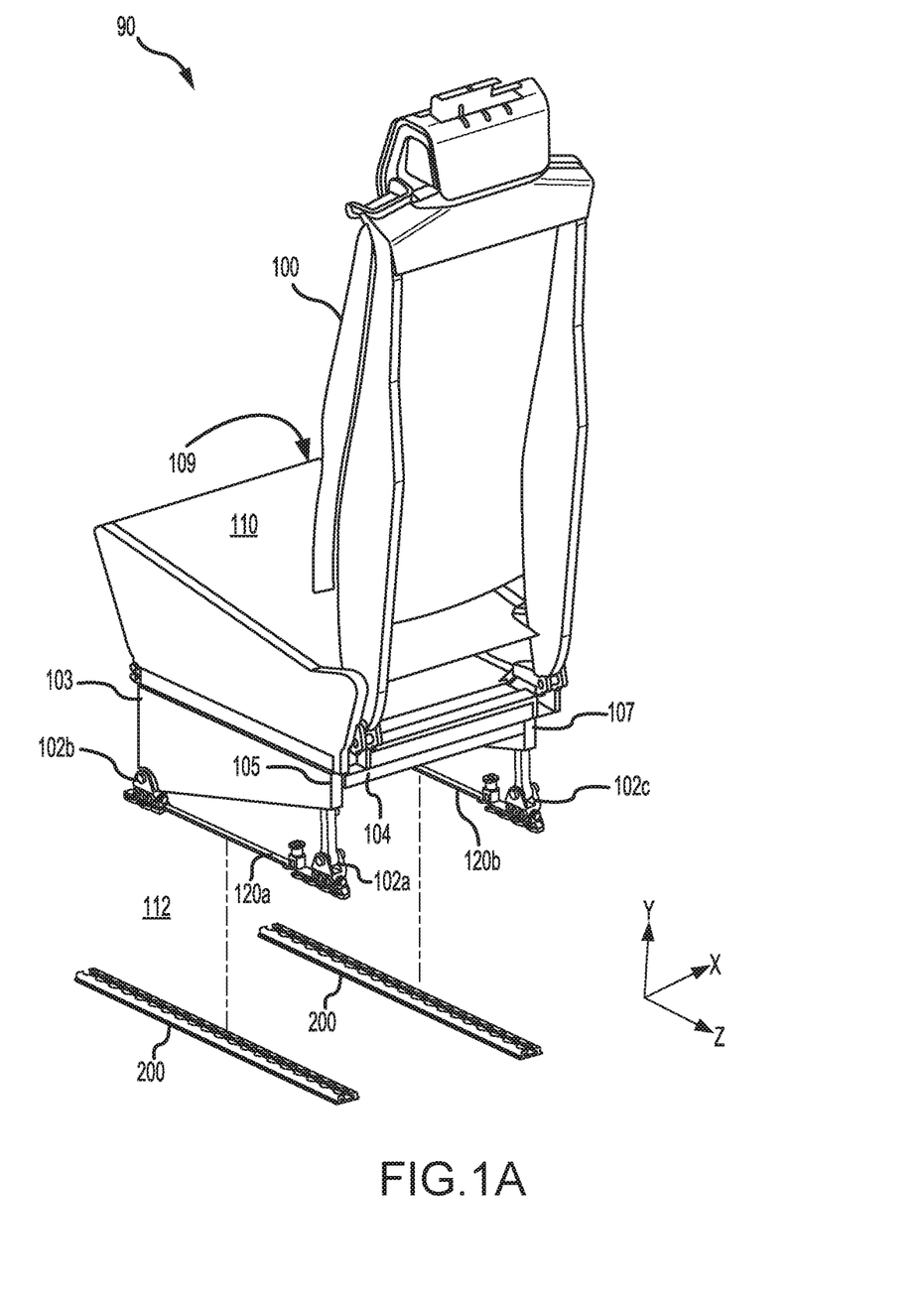
FIG. 1A illustrates an assembly view of an aircraft seat assembly, in accordance with various embodiments.

With reference now to FIG. 1A, a perspective view of an aircraft seat assembly 90 is shown. In various embodiments, aircraft seat assembly 90 includes a seat 100 and one or more seat track(s) 200. Seat tracks 200 may be coupled or otherwise integrated into an aircraft floor 112. In various embodiments, seat 100 may include a seat pan 110 coupled to a seat pedestal 104. Seat pedestal 104 includes a plurality of feet (e.g., foot 102a, foot 102b, and foot 102c). In various embodiments, seat pedestal 104 includes four feet with one foot 102b located at a left-forward corner 103 of seat pedestal 104, one foot 102a located at a left-aft corner 105 of seat pedestal 104, one foot 102c located at a right-aft corner 107 of seat pedestal 104, and one foot, similar to foot 102a, located at a right-forward corner 109 of seat pedestal 104.

Seat 100 further includes a left (or first) track fitting 120a and a right (or second) track fitting 120b. Left and right track fittings 120a, 120b may each extend between at least two feet 102 of seat pedestal 104. For example, left track fitting 120a may be coupled to left-aft foot 102a (also referred to as a first aft foot) and left-forward foot 102b (also referred to as a first forward foot). Right track fitting 120b may be coupled to a right-aft foot 102c (also referred to as a second aft foot) and a right forward foot (also referred to as a second forward foot) similar to left-forward foot 102b.

Left and right track fittings 120a, 120b may provide an interface between seat 100 and seat tracks 200. In this regard, seat 100 may be coupled to aircraft floor 112 by locating left and right track fittings 120a, 120b in seat tracks 200, which are attached to aircraft floor 112.

Figure 4A:
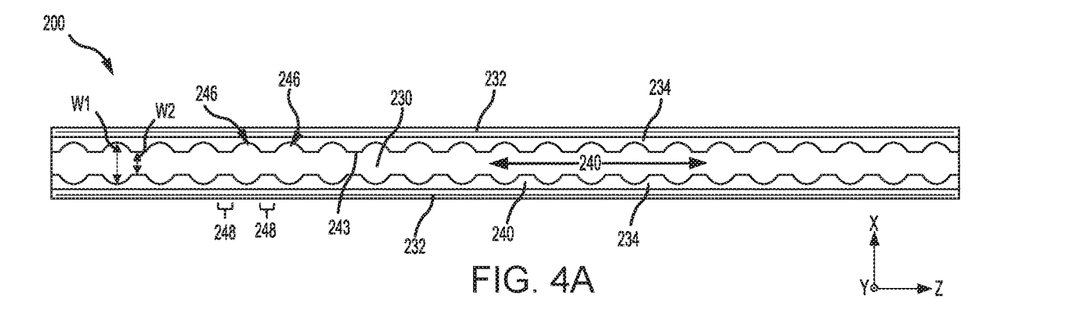
FIG. 4A illustrates a downward looking view of a seat track, in accordance with various embodiments.
Figure 4B:
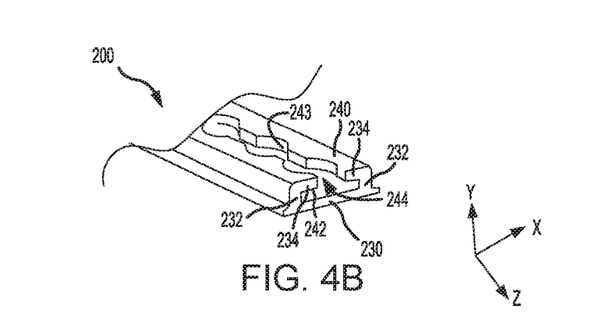
FIG. 4B illustrates a perspective view of a portion of the seat track of FIG. 4A, in accordance with various embodiments.

With reference to FIGS. 4A and 4B, a seat track 200 is illustrated, in accordance with various embodiments. Seat track 200 may include a base portion 230, a pair of opposing walls 232, and a pair of lips 234. Base portion 230 may extend longitudinally along the aircraft floor. In other words, base portion 230 may extend in a forward to aft direction (i.e., along the Z-axis). Walls 232 may extend vertically (i.e., along the X-axis) from the base portion 230. In this regard, walls 232 may be generally perpendicular to base portion 230 and aircraft floor 112 (FIG. 1A). As used in the previous context, "generally perpendicular" means±5° from perpendicular. Opposing walls 232 are spaced apart from each other and are disposed substantially parallel to one another. As used in the previous context, "substantially parallel" means±5° from parallel. Lips 234 extend horizontally (i.e., along the X-axis) from the ends of walls 232 and toward one another. Lips 234 each include a first surface 240, a second surface 242 opposite the first surface 240, and a vertical surface 243 extending between first surface 240 and second surface 242. First surface 240 is oriented away from base portion 230 (i.e., toward seat pan 110 of FIG. 1A). Second surface 242 is oriented towards base portion 230 (i.e., away from seat pan 110). Vertical surface 243 may be oriented generally perpendicular to base portion 230 and aircraft floor 112 (FIG. 1A). As used in the previous context, "generally perpendicular" means±5° from perpendicular.

Base portion 230, walls 232, and second surface 242 of lips 234 define a slot 244. Slot 244 extends longitudinally along a length of seat track 200. Slot 244 is configured to receive, at least, a portion of left track fitting 120a or right track fitting 120b, with momentary reference to FIG. 1A. In various embodiments, vertical surface 243 of lips 234 defines a plurality of arcuate access openings 246 and a plurality of neck sections 248 interspersed between arcuate access openings 246. Arcuate access openings 246 each include a width W1, as measured along the X-axis. Neck sections 248 each include a width W2, as measured along the X-axis. The width W2 of neck sections 248 is less than the width W1 of arcuate access openings 246. As discussed in further detail below, arcuate access openings 246 are configured to receive horizontally extending protrusions of left and right track fittings 120a, 120b, and neck sections 248 are configured to form an interference with the protrusions to restrict vertical movement of the track fitting.

Figure 1B:
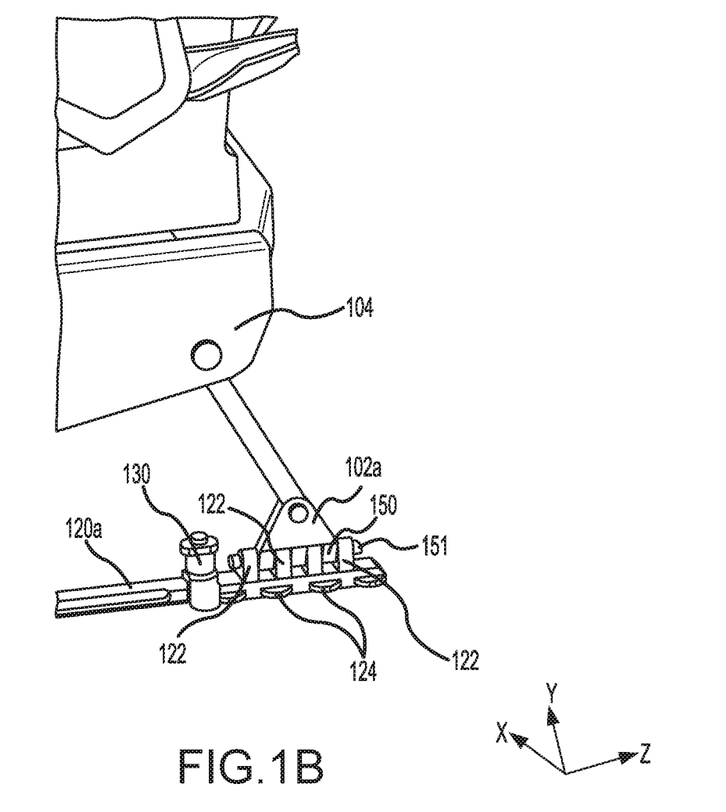
FIG. 1B illustrates a track fitting attached to an aft foot of a seat, in accordance with various embodiments.

With reference to FIG. 1B, left-aft foot 102a of seat pedestal 104 is shown coupled to left track fitting 120a, in accordance with various embodiments. While left-aft foot 102a and left track fitting 120a are described with reference to FIG. 1B, it is understood that the other feet 102 of seat pedestal 104 and right track fitting 120b include elements and functionalities as described herein with respect to left-aft foot 102a and left track fitting 120a. Left-aft foot 102a includes one or more foot flange(s) 150. Foot flanges 150 are located adjacent and/or between aft track flanges 122 of left track fitting 120a. A fastener 151, for example, a pin, rivet, nut and bolt, clip, or other securement device, is located through foot flanges 150 and aft track flanges 122 to secure left-aft foot 102a to left track fitting 120a.

Figure 2:
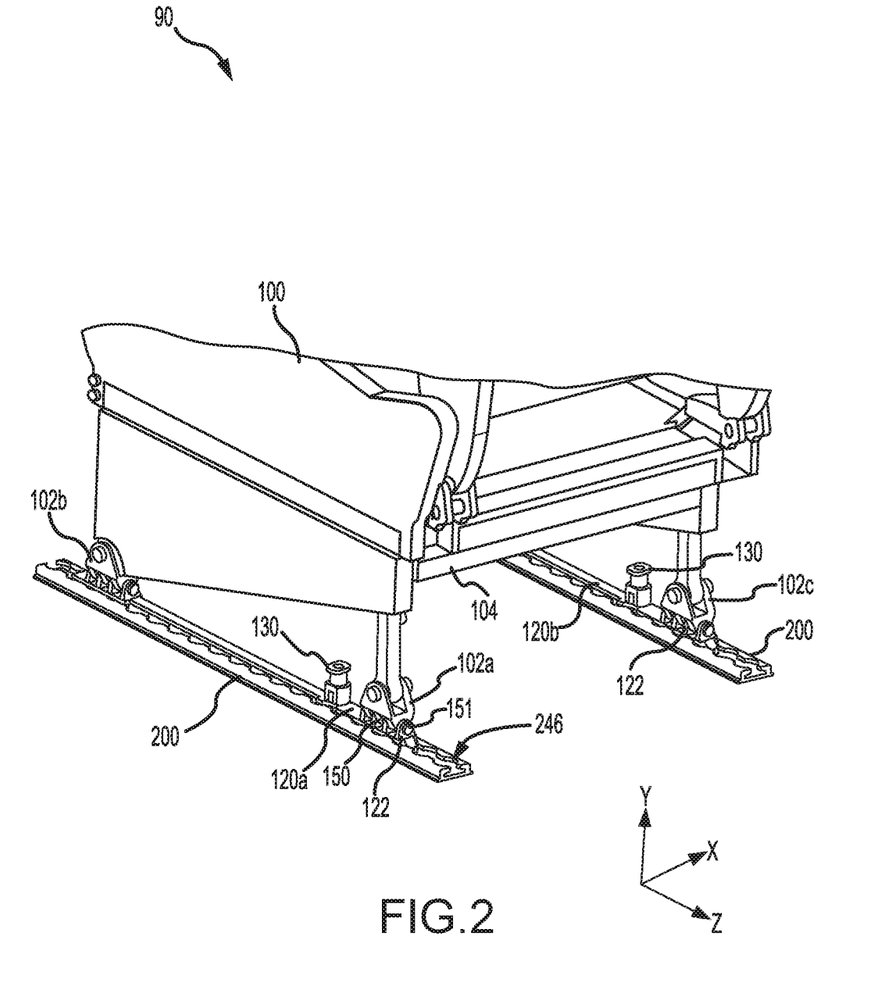
FIG. 2 illustrates a track fitting coupling a seat to a seat track, in accordance with various embodiments.
Figures 7A, 7B, 8A, 8B:
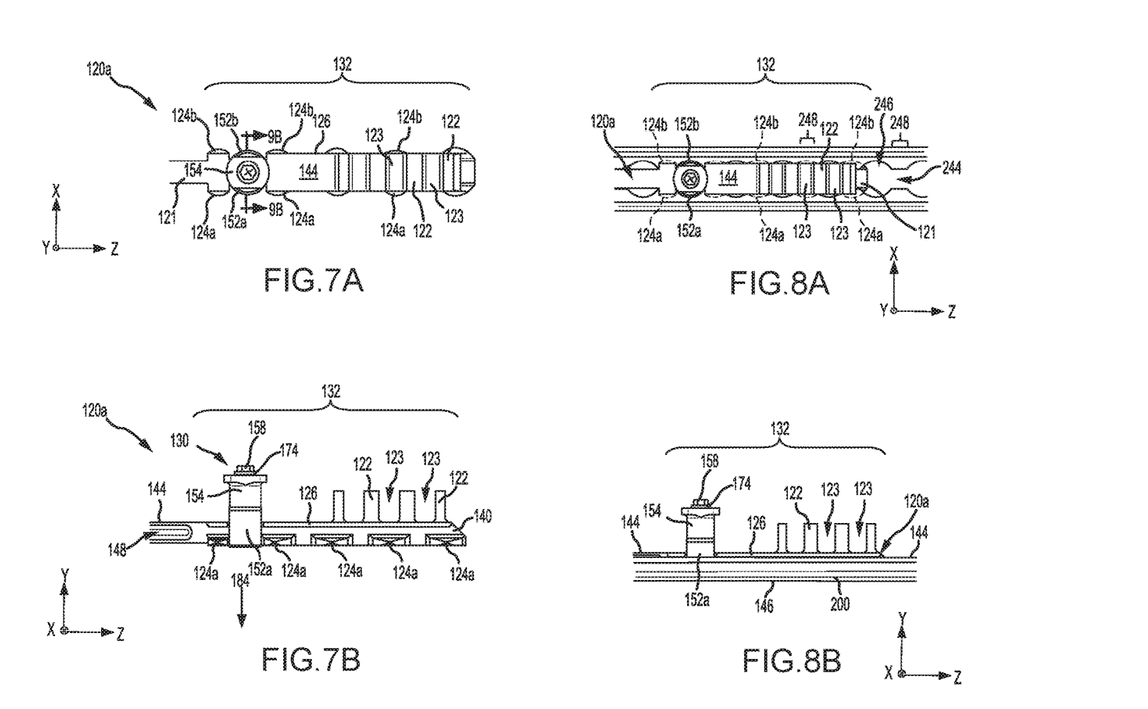
FIGS. 7A and 7B illustrate, respectively, a downward looking view and a side view of an aft section of a track fitting with the quick-release lock in a locked position, in accordance with various embodiments.
FIGS. 8A and 8B illustrate, respectively, a downward looking view and a side view of an aft section of a track fitting located within a seat track and in a locked state, in accordance with various embodiments.

Left track fitting 120a includes aft protrusions 124. Aft protrusions 124 are provided with a shape complementary to arcuate access openings 246, with momentary reference to FIG. 4A. With reference to FIG. 2, aircraft seat assembly 90 is illustrated with left and right track fittings 120a, 120b of seat 100 located in seat tracks 200. Left and right track fittings 120a, 120b each include a lock assembly 130 (also referred to herein a quick-release lock). Lock assembly 130 is movable between a locked position (FIGS. 5A and 5B) and an unlocked position (FIGS. 7A and 7B). The locked position inhibits forward and aft movement of left and right track fittings 120a, 120b (and thus seat 100) relative to seat tracks 200. The unlock position permits forward and aft movement of left and right track fittings 120a, 120b (and thus seat 100) relative to seat tracks 200.

Figure 3A:
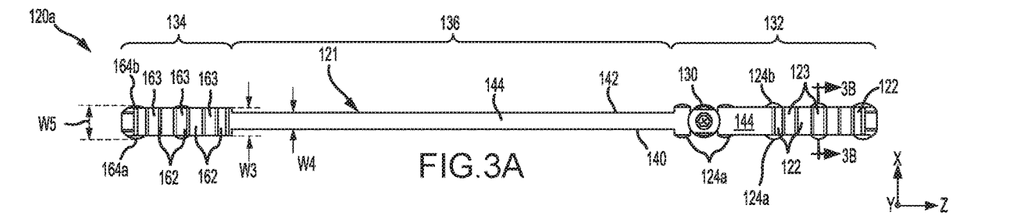
FIG. 3A illustrates a downward looking view of a track fitting having a quick-release lock, in accordance with various embodiments.
Figure 3B:
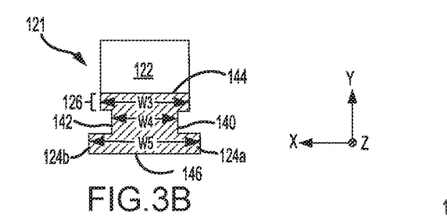
FIG. 3B illustrates a cross-sectional view of the track fitting of FIG. 3A taken along the line 3B-3B in FIG. 3A, in accordance with various embodiments.
Figure 3C:
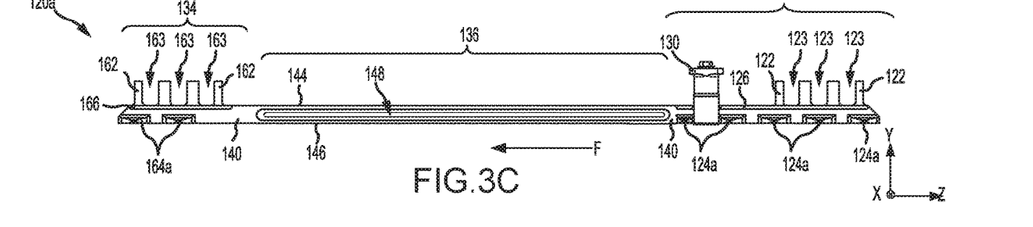
FIG. 3C illustrates a side view of the track fitting of FIG. 3A, in accordance with various embodiments.

Referring to FIGS. 3A, 3B, and 3C a downward view, a cross-section view, and a side view, respectively, of left track fitting 120a are illustrated, in accordance with various embodiments. While left track fitting 120a is described with reference to FIGS. 3A, 3B, and 3C, it is understood that right track fitting 120b (FIG. 1A) includes the elements and functionalities as described herein with respect to left track fitting 120a. Left track fitting 120a includes a strut 121 having an aft section 132, a forward section 134, and a central section 136. In various embodiments, strut may be formed of material comprising steel, stainless steel, aluminum, aluminum alloy, titanium, titanium alloy, composite, or a polymeric material.

Aft section 132 of strut 121 includes aft track flanges 122, aft protrusions 124a, 124b, and lock assembly 130. Aft track flanges 122 extend vertically from a top surface 144 of strut 121. Top surface 144 is opposite a bottom surface 146 of strut 121. In various embodiments, top surface 144 is oriented away from aircraft floor 112, with momentary reference to FIG. 1A, and bottom surface 146 is orient toward base portion 230 of seat track 200. Aft track flanges 122 and top surface 144 define a plurality of aft channels 123. Aft channels 123 are configured to receive foot flanges 150 of left-aft foot 102a, with momentary reference to FIG. 1B. Aft protrusions 124a may extend horizontally from a first sidewall surface 140 of strut 121. Aft protrusions 124b may extend horizontally from a second sidewall surface 142 of strut 121. Second sidewall surface 142 is oriented away from first sidewall surface 140. First and second sidewall surfaces 140, 142 are generally perpendicular to top and bottom surfaces 144, 146. As used in the previous context, "generally perpendicular" means±5° from perpendicular.

In various embodiments, a lip or shelf 126 may be formed in aft section 132 proximate top surface 144. Shelf 126 comprises a portion of strut 121 in aft section 132 having a width W3, as measured along the X-axis. Width W3 is greater than a width W4 of strut 121 extending from first sidewall surface 140 to second sidewall surface 142. In various embodiments, width W3 may be less than a width W5 of strut 121 extending from aft protrusion 124a to aft protrusion 124b. With combined reference to FIGS. 3B and 4A, width W5 of strut 121 is less than width W1 of arcuate access openings 246 in seat track 200 and greater than width W2 of neck sections 248. Width W4 of structure is less than width W2 of neck sections 248. Widths W4 and W5 of strut 121 allow left track fitting 120a to be inserted into seat track 200 by locating aft protrusions 124a, 124b through arcuate access openings 246. Left track fitting 120a may then be translated forward or aft until neck sections 248 are located over aft protrusions 124a, 124b such that second surface 242 forms an interference with aft protrusions 124a, 124b to prevent vertical movement of left track fitting 120a. In various embodiments, width W3 of strut 121 may be greater than width W2 of neck sections 248 such that shelf 126 contacts first surface 240 of lips 234, when left track fitting 120a is located in seat track 200.

Returning to FIGS. 3A and 3C, forward section 134 of strut 121 includes forward track flanges 162 and forward protrusions 164a and 164b. Forward track flanges 162 extend vertically from top surface 144 of strut 121. Forward track flanges 162 and top surface 144 define a plurality of forward channels 163. Forward channels 163 are configured to receive foot flanges 150 of left-forward foot 102b, with momentary reference to FIG. 1B. Forward protrusions 164a extend horizontally from first sidewall surface 140 of strut 121. Forward protrusions 164b extend horizontally from second sidewall surface 142 of strut 121. Forward protrusions 164a, 164b are configured such that strut 121 includes width W5 extending from forward protrusion 164a to forward protrusion 164b. In various embodiments, a lip or shelf 166 may be formed in forward section 134 proximate top surface 144. Shelf 166 comprises a portion of strut 121 in forward section 134 having width W3, as measured along the X-axis.

With combined reference to FIGS. 3A, 3C, and 4A, forward protrusions 164a, 164b are spaced relative to aft protrusions 124a, 124b such that aligning forward protrusions 164a, 164b with arcuate access openings 246 of seat track 200 will cause aft protrusions 124a, 124b to also be aligned with arcuate access openings 246, and aligning aft protrusions 124a, 124b with neck sections 248 will cause forward protrusions 164a, 164b to be aligned with neck sections 248. Strut 121 may comprise a monolithic or unibody member. In this regard, forward protrusions 164a, 164b and aft protrusions 124a, 124b may be manipulated simultaneously from a single contact point. For example, if the portion of bottom surface 146 in aft section 132 is oriented parallel to base portion 230 of seat track 200, then the portion of bottom surface 146 in forward section 134 also tends to be parallel base portion 230. Referring to FIG. 1B, allowing left-forward foot 102b and left-aft foot 102a to be coupled to seat track 200 simultaneously may simplify installation and/or reduce installation time of seat 100.

Central section 136 of strut 121 extends from aft section 132 to forward section 134, or generally from aft shelf 126 to forward shelf 166. Central section generally comprises width W4 extending from first sidewall surface 140 to second sidewall surface 142. In various embodiments, a groove 148 may be formed in a portion of first sidewall surface 140 in central section 136. Stated differently, a portion of first sidewall surface 140 in central section 136 defines groove 148. In various embodiments, a portion of second sidewall surface 142 in central section 136 may define a groove similar to groove 148. Groove 148 may reduce a weight of strut 121. In various embodiments, groove may extend completely through strut 121 (i.e., from first sidewall surface 140 to second sidewall surface 142).

During braking or an impact event, a force F (shown as arrow F in FIG. 3C) experience or applied to strut 121 is in a generally aft to forward direction. Lock assembly 130 is configured to interface with strut 121 and seat track 200 to prevent or reduce forward movement of left track fitting 120a. In this regard, the direction of force F may cause central section 136 to experience tension, rather than compression, forces. Thus, strut 121 may be formed from a lighter material (e.g., aluminum), the width W4 of strut 121, and/or a volume of the material of strut 121 in central section 136 may be reduced as buckling is not a concern due to the lack of compression forces experienced in central section 136.

Figure 5A:
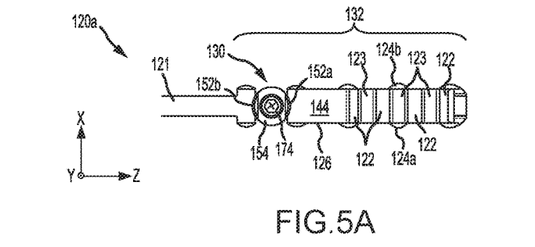
FIGS. 5A and 5B illustrate, respectively, a downward looking view and a side view of an aft section of a track fitting with the quick-release lock in an unlocked position, in accordance with various embodiments.
Figure 5B:
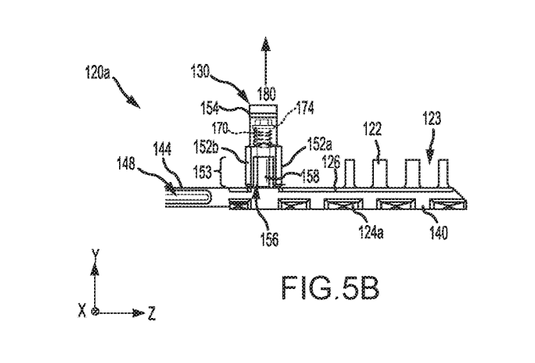
Figure 9A:
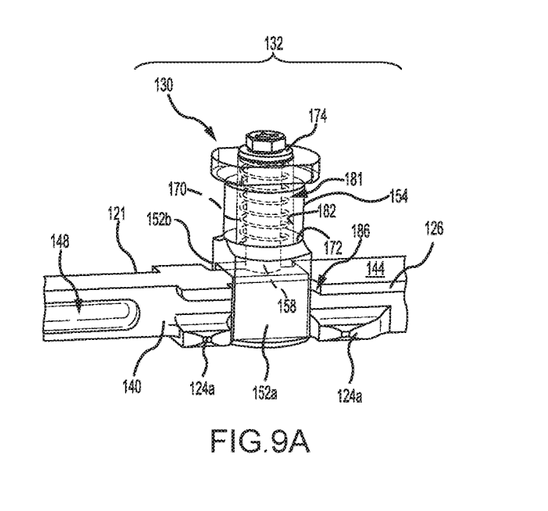
FIG. 9A illustrates a perspective view of a quick-release lock in a locked position, in accordance with various embodiments.
Figure 9B:
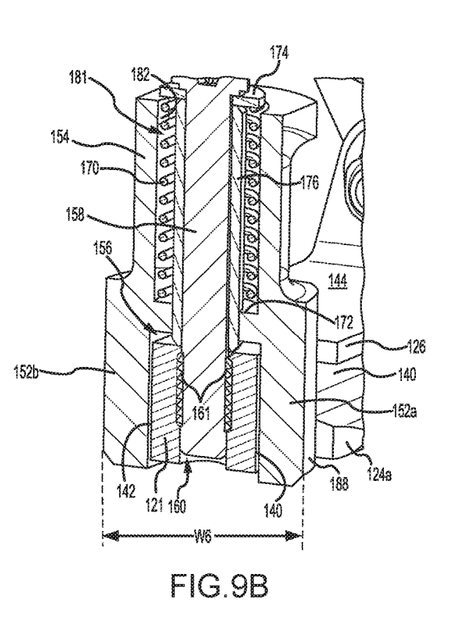
FIG. 9B illustrates a cross-section view of a quick-release lock in a locked position taken along the line 9B-9B in FIG. 7A, in accordance with various embodiments.

With reference to FIGS. 5A and 5B, aft section 132 of left track fitting 120a is illustrated with lock assembly 130 in an unlocked position. In various embodiments, lock assembly 130 comprises a plunger 154. A portion 153 of plunger 154 may comprise a U-shape. Stated differently, portion 153 may comprise a channel 156 defined by a first lug arm 152a and a second lug arm 152b of plunger 154. Lock assembly 130 may include a shaft 158. With momentary reference to FIG. 9B, shaft 158 may be located in an orifice 160 defined by strut 121. in various embodiments, shaft 158 may include threading 161 configured to engage threading in orifice 160 and secure lock assembly 130 to strut 121. Threading 161 is one example of means of securing lock assembly 130 to strut 121. It is further contemplated and understand that shaft 158 and/or lock assembly 130 may be coupled to strut 121 using any suitable attachment device (e.g., a rivet, a nut and bolt, a clip, etc.). With continued reference to FIG. 9B, lock assembly 130 may further include a spring 170. Spring 170 may be located around shaft 158. Spring 170 may be in contact with a surface 172 of plunger 154 and a collar 174 located distal surface 172. Collar 174 may be located over a spring guide 176 positioned on top surface 144 of strut 121 and between spring 170 and shaft 158. Spring 170 may be located in a spring cavity 181 defined by an internal (or radially inward) surface 182 of plunger 154. Spring 170 is configured to apply a biasing force against surface 172 of plunger 154. With combined reference to FIGS. 9B and 5B, in the unlocked position, as shown in FIG. 5B, surface 172 is translated toward collar 174, causing spring 170 to compress between surface 172 and collar 174. In various embodiments, in the unlocked position, collar 174 may be located within spring cavity 181.

Returning to FIGS. 5A and 5B, plunger 154 may be configured to rotate about shaft 158. In the unlocked position, plunger 154 is translated upward (in the direction of arrow 180 in FIG. 5B) and rotated about shaft 158 such that first and second lug arms 152a, 152b are located on top surface 144 of strut 121. Plunger 154 may translate relative to shaft 158 and collar 174. Stated differently, shaft 158 and collar 174 may be fixedly attached to strut 121, such that shaft 158 and collar 174 remain stationary when plunger 154 is translated. Translation of plunger 154 in the direction of arrow 180 may cause spring 170 to compress.

Figure 6A:
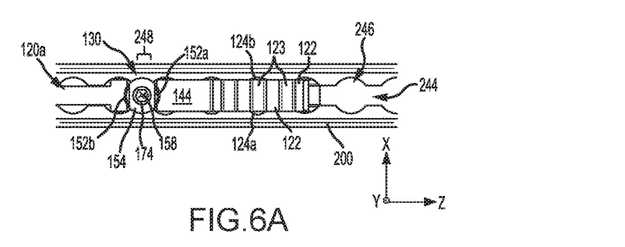
FIGS. 6A and 6B illustrate, respectively, a downward looking view and a side view of an aft section of a track fitting located within a seat track and in an unlocked state, in accordance with various embodiments.
Figure 6B:
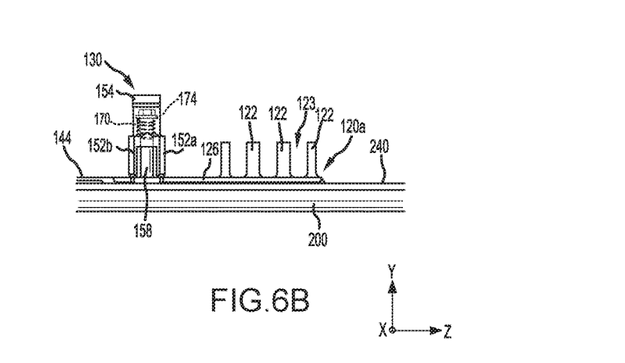

FIGS. 6A and 6B illustrate aft section 132 of left track fitting 120a located in seat track 200 and in an unlocked stated. In the unlocked state, aft protrusions 124a, 124b are aligned with arcuate access openings 246 of seat track 200, and lock assembly 130 is in the unlocked position with first and second lug arms 152a, 152b located on top surface 144 of strut 121. A location of lock assembly 130 may be selected such that, in the unlocked state, plunger 154 will be aligned vertically with a neck section 248 of seat track 200. In the unlocked state, left track fitting 120a may translate in the forward and aft directions in slot 244 of seat track 200.

With reference to FIGS. 7A and 7B and FIGS. 9A and 9B, aft section 132 of left track fitting 120a is illustrated with lock assembly 130 in a locked position. In the locked position, strut 121 may located between first and second lug arms 152a, 152b of plunger 154. Stated differently, strut 121 may be located in channel 156 with first lug arm 152a located over first sidewall surface 140 and second lug arm 152b located over second sidewall surface 142. In various embodiments, lock assembly 130 is translated to the locked position by rotating plunger 154 about shaft 158. Plunger 154 is rotated until first and second lug arms 152a, 152b are no longer located over top surface 144 of strut 121. With top surface 144 of strut 121 removed from the path of first and second lug arms 152a, 152b, the biasing force applied to surface 172 by spring 170 causes plunger 154 to translate downward (i.e., in the direction of arrow 184 in FIG. 7B). In various embodiments, first lug arm 152a may be located between a pair of adjacent aft protrusions 124a and second lug arm 152b may be located between a pair of adjacent aft protrusions 124b. First and second lug arms 152a, 152b may be located in gaps 186 defined by shelf 126. Gaps 186 may be configured to receive first and second lug arms 152a, 152b. In various embodiments, a width of strut 121 at gaps 186, as measured along the X-axis, may be equal to width W4, with momentary reference to FIG. 3B.

FIGS. 8A and 8B illustrate aft section 132 of left track fitting 120a located in seat track 200 and in a locked stated. In the locked state, aft protrusions 124a, 124b are aligned with neck sections 248 of seat track 200, and lock assembly 130 is in the locked position with first and second lug arms 152a, 152b located in an arcuate access opening 246 of seat track 200. In this regard, the location of lock assembly 130 may be selected such that, in the locked state, plunger 154 will be aligned vertically with an arcuate access opening 246 of seat track 200 when aft protrusions 124a, 124b are aligned vertically with neck sections 248. Plunger 154 is configured to form an interference with neck sections 248 to prevent or reduce forward and aft translation of strut 121 within slot 244. For example, a width or spacing of first and second lug arms 152a, 152b is selected such that in the locked state (i.e., when first and second lug arms 152a, 152b are located in an arcuate access opening 246), neck sections 248 contact first and second lug arms 152a, 152b, generating an interference which tends to prevent or limit translation of strut 121 in the forward and aft directions. In this regard, a width W6 of plunger 154 as measured between an external (or radially outward) surface 188 of first and second lug arms 152a, 152b is less than width W1 of arcuate access openings 246 and greater than width W2 of neck sections 248. In various embodiments, width W6 is equal to width W5 of strut 121, with momentary reference to FIGS. 3A and 3B.

Limiting forward translation of strut 121 from aft section 132, may cause the portions of strut 121 forward of lock assembly 130 (e.g., central section 136 and forward section 134 as shown in FIG. 3A) to experience tension, rather than compression, force during braking or a high impact event. In this regard, a lighter material may be employed for strut 121 and/or a volume of material of strut 121 may be reduced, for example, by forming grooves 148, as strut 121 does need a material having the compressive strength associated with withstanding compression force associated with bending or buckling the strut. In this regard, locating lock assembly 130 at aft section 132 may reduce occurrences of strut 121 bending or buckling during braking or a high impact event.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A track fitting for securing a seat pedestal of an aircraft seat to a floor of an aircraft, the track fitting comprising:
   a strut including:
      an aft section configured to attach to an aft foot of the seat pedestal,
      a forward section configured to attach to a forward foot of the seat pedestal, and
      a central section extending between the aft section and the forward section; and
   a lock assembly located proximate the aft section of the strut, the lock assembly comprising:
      a shaft coupled to the strut, and
      a plunger configured to rotate relative to the strut and about the shaft, the plunger comprising a channel defined by a first lug arm of the plunger and a second lug arm of the plunger, wherein the plunger rotates between an unlocked position and a locked position by rotating about the shaft, and wherein in the unlocked position, the first lug arm and the second lug arm of the plunger are located on a top surface of the strut, and wherein in the locked position, the strut is located between the first lug arm and the second lug arm of the plunger.

2. The track fitting of claim 1, wherein the aft section of the strut comprises a plurality of aft protrusions extending horizontally from the strut, and wherein the forward section of the strut comprises a plurality of forward protrusions extending horizontally from the strut.

3. The track fitting of claim 2, wherein the aft section of the strut further comprises a plurality of aft flanges extending vertically from the strut, and wherein the forward section of the strut further comprises a plurality forward flanges extending vertically from the strut.

4. The track fitting of claim 1, wherein the lock assembly further comprises a spring configured to apply a biasing force to the plunger.

5. The track fitting of claim 1, wherein the plunger is configured to rotate 90° about the shaft between the locked position.

6. The track fitting of claim 5, wherein the aft section of the strut comprises:
   a first aft protrusion extending from a first sidewall surface of the strut; and
   a second aft protrusion extending from a second sidewall surface of the strut opposite the first sidewall surface of the strut, and wherein a width of the plunger as measured between an external surface of the first lug arm and the second lug arm is equal to a width of the strut as measured between the first aft protrusion and the second aft protrusion.

7. The track fitting of claim 1, wherein a sidewall surface of the central section of the strut defines a groove.

8. A seat pedestal, comprising
   a forward foot;
   an aft foot located aft of the forward foot; and
   a track fitting coupled to the forward foot and the aft foot, the track fitting comprising:
      a strut including an aft section coupled to the aft foot, a forward section coupled to the forward foot, and a central section extending between the aft section and the forward section, wherein the aft section of the strut comprises a first aft protrusion extending from a first sidewall surface of the strut and a second aft protrusion extending from a second sidewall surface of the strut, the second sidewall surface being opposite the first sidewall surface of the strut, and wherein a width of the central section of the strut as measured between the first sidewall surface of the strut and the second sidewall surface of the strut is less than a width of the aft section of the strut as measured between the first aft protrusion and the second aft protrusion, such that the central section of the strut may be located in a seat track, and
      a lock assembly located proximate the aft section of the strut.

9. The seat pedestal of claim 8, wherein the lock assembly comprises:
   a shaft coupled to the strut;
   a plunger configured to rotate relative to the strut and about the shaft, the plunger comprising a channel defined by a first lug arm of the plunger and a second lug arm of the plunger, wherein the plunger rotates between an unlocked position and a locked position by rotating about the shaft, and wherein in the unlocked position the first lug arm and the second lug arm of the plunger are located on a top surface of the strut, and wherein in the locked position the strut is located between the first lug arm and the second lug arm of the plunger; and
   a spring configured to apply a biasing force to the plunger.

10. The seat pedestal of claim 9, wherein the plunger is configured to rotate 90° about the shaft between the unlocked position and the locked position.

11. The seat pedestal of claim 9, wherein a width of the plunger as measured at an external surface of the first lug arm and the second lug arm is equal to the width of the strut as measured between the first aft protrusion and the second aft protrusion.

12. The seat pedestal of claim 8, wherein the first sidewall surface in the central section of the strut defines a groove.

13. The seat pedestal of claim 8, wherein the aft section of the strut further comprises:
   a shelf located proximate a top surface of the strut, and wherein a width of the strut as measured at the shelf is less than the width of the strut as measured between the first aft protrusion and the second aft protrusion.

14. The seat pedestal of claim 13, wherein the width of the strut as measured at the shelf is greater than the width of the central section as measured between the first sidewall surface and the second sidewall surface.

15. An aircraft seat assembly, comprising:
   a seat pedestal including:
      a forward foot and an aft foot, and
      a track fitting coupled to the forward foot and the aft foot, the track fitting comprising:
         a strut including an aft section coupled to the aft foot, a forward section coupled to the forward foot, and a central section extending between the aft section and the forward section, wherein the aft section of the strut comprises a plurality of aft protrusions extending horizontally from the strut, and wherein the forward section of the strut comprises a plurality of forward protrusions extending horizontally from the strut, and
         a lock assembly located proximate the aft foot, the lock assembly comprising a plunger, wherein a portion of the plunger includes a channel defined by a first lug arm and a second lug arm, and wherein the plunger is configured to rotate between an unlocked position and a locked position, and wherein in the unlocked position the first lug arm and the second lug arm of the plunger are located on a top surface of the strut, and wherein in the locked position the strut is located between the first lug arm and the second lug arm of the plunger; and a seat track configured to receive the aft section, the forward section, and the central section of the strut, wherein the track fitting is configured to translate between an unlocked state and a locked state, and wherein in the unlocked state the plunger is in the unlocked position and the plurality of aft protrusions is vertically aligned with a plurality of arcuate access openings defined by the seat track, and wherein in the locked state the plunger is in the locked position and the plurality of aft protrusions is vertically aligned with a plurality of neck sections of the seat track.

16. The aircraft seat assembly of claim 15, wherein in the locked state the plunger is located in a first arcuate access opening of the plurality of arcuate access openings, and at least one of the first lug arm or the second lug arm contacts a first neck section of the plurality of neck sections.

\* \* \* \* \*